US008565120B2

(12) United States Patent
Acher et al.

(10) Patent No.: US 8,565,120 B2
(45) Date of Patent: Oct. 22, 2013

(54) LOCALITY MAPPING IN A DISTRIBUTED PROCESSING SYSTEM

(75) Inventors: Charles J. Acher, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 12/985,075

(22) Filed: Jan. 5, 2011

(65) Prior Publication Data

US 2012/0174105 A1  Jul. 5, 2012

(51) Int. Cl.
*H04L 12/28* (2006.01)
(52) U.S. Cl.
USPC .......................................................... 370/254
(58) Field of Classification Search
None
See application file for complete search history.

(56) References Cited

U.S. PATENT DOCUMENTS

| | | |
|---|---|---|
| 5,063,562 A | 11/1991 | Barzilai et al. |
| 5,095,444 A | 3/1992 | Motles |
| 5,414,839 A | 5/1995 | Joshi |
| 5,491,691 A | 2/1996 | Shtayer et al. |
| 5,859,981 A | 1/1999 | Levin et al. |
| 5,862,381 A | 1/1999 | Advani et al. |
| 5,912,893 A | 6/1999 | Rolfe et al. |
| 5,918,020 A | 6/1999 | Blackard et al. |
| 5,937,201 A | 8/1999 | Matsushita et al. |
| 5,953,336 A | 9/1999 | Moore et al. |
| 5,982,771 A | 11/1999 | Caldara et al. |
| 5,999,734 A | 12/1999 | Willis et al. |
| 6,057,839 A | 5/2000 | Advani et al. |
| 6,115,357 A | 9/2000 | Packer et al. |
| 6,118,777 A | 9/2000 | Sylvain |
| 6,126,331 A | 10/2000 | Komatsu et al. |
| 6,167,490 A | 12/2000 | Levy et al. |
| 6,253,372 B1 | 6/2001 | Komatsu et al. |
| 6,336,143 B1 | 1/2002 | Diedrich et al. |
| 6,343,339 B1 | 1/2002 | Daynes |
| 6,438,702 B1 | 8/2002 | Hodge |
| 6,490,566 B1 | 12/2002 | Schmidt |
| 6,600,721 B2 | 7/2003 | Edholm |
| 6,772,255 B2 | 8/2004 | Daynes |
| 6,775,703 B1 | 8/2004 | Burns et al. |
| 6,839,829 B1 | 1/2005 | Daruwalla et al. |

(Continued)

OTHER PUBLICATIONS

Willis, "MinSim: Optimized, Compiled VHDL Simulation Using Networked & Parallel Computers", 1993, Proceedings of Fall 1993 VHDL International User's Forumn, pp. 197-144.

(Continued)

*Primary Examiner* — Otis L Thomas, Jr.
(74) *Attorney, Agent, or Firm* — Biggers & Ohanian, LLP (57) ABSTRACT

Topology mapping in a distributed processing system that includes a plurality of compute nodes, including: initiating a message passing operation; including in a message generated by the message passing operation, topological information for the sending task; mapping the topological information for the sending task; determining whether the sending task and the receiving task reside on the same topological unit; if the sending task and the receiving task reside on the same topological unit, using an optimal local network pattern for subsequent message passing operations between the sending task and the receiving task; otherwise, using a data communications network between the topological unit of the sending task and the topological unit of the receiving task for subsequent message passing operations between the sending task and the receiving task.

18 Claims, 8 Drawing Sheets

(56) References Cited

U.S. PATENT DOCUMENTS

| | | | |
|---|---|---|---|
| 7,032,224 B2 | 4/2006 | Kadakia et al. | |
| 7,299,155 B2 | 11/2007 | Ebert et al. | |
| 7,458,077 B2 | 11/2008 | Duke | |
| 7,478,138 B2 | 1/2009 | Chang et al. | |
| 7,480,298 B2 | 1/2009 | Blackmore et al. | |
| 7,509,244 B1 | 3/2009 | Shakeri et al. | |
| 7,527,558 B2 | 5/2009 | Lavoie et al. | |
| 7,743,382 B2 | 6/2010 | Schumacher et al. | |
| 7,813,369 B2 | 10/2010 | Blackmore et al. | |
| 7,953,085 B2 | 5/2011 | Chang et al. | |
| 8,087,025 B1 | 12/2011 | Graupner | |
| 2001/0014758 A1 | 8/2001 | Baniel et al. | |
| 2002/0065930 A1 | 5/2002 | Rhodes | |
| 2002/0194392 A1 | 12/2002 | Cheng et al. | |
| 2003/0021287 A1 | 1/2003 | Lee et al. | |
| 2003/0093254 A1 | 5/2003 | Frankel et al. | |
| 2003/0093255 A1 | 5/2003 | Freyensee et al. | |
| 2004/0107240 A1* | 6/2004 | Zabarski et al. | 709/201 |
| 2004/0111398 A1 | 6/2004 | England et al. | |
| 2004/0255002 A1* | 12/2004 | Kota et al. | 709/213 |
| 2005/0138161 A1 | 6/2005 | McDaniel et al. | |
| 2005/0278453 A1 | 12/2005 | Cherkasova | |
| 2006/0075067 A1 | 4/2006 | Blackmore et al. | |
| 2006/0107262 A1 | 5/2006 | Bodas et al. | |
| 2006/0203739 A1 | 9/2006 | Padmanabhan et al. | |
| 2007/0179760 A1 | 8/2007 | Smith | |
| 2007/0260746 A1* | 11/2007 | Mirtorabi et al. | 709/238 |
| 2007/0294426 A1 | 12/2007 | Huang et al. | |
| 2008/0109569 A1 | 5/2008 | Leonard et al. | |
| 2008/0168177 A1 | 7/2008 | Subramaniam | |
| 2008/0240115 A1 | 10/2008 | Briscoe et al. | |
| 2008/0306721 A1 | 12/2008 | Yang | |
| 2009/0003344 A1 | 1/2009 | Kumar | |
| 2009/0025604 A1 | 1/2009 | Deroover et al. | |
| 2009/0067334 A1* | 3/2009 | Archer et al. | 370/238 |
| 2009/0201832 A1* | 8/2009 | Brown | 370/254 |
| 2009/0300154 A1 | 12/2009 | Branson et al. | |
| 2010/0241774 A1 | 9/2010 | Olszewski et al. | |
| 2010/0287320 A1* | 11/2010 | Querol et al. | 710/260 |
| 2012/0185873 A1* | 7/2012 | Archer et al. | 719/313 |
| 2012/0210094 A1* | 8/2012 | Blocksome et al. | 711/206 |

OTHER PUBLICATIONS

Final Office Action, U.S. Appl. No. 11/924,934, Jan. 6, 2012.
Advisory Action, U.S. Appl. No. 11/865,981, Oct. 14, 2011.
Advisory Action, U.S. Appl. No. 11/764,333, Nov. 28, 2011.
Notice of Allowance, U.S. Appl. No. 11/832,192, Aug. 11, 2011.
Office Action, U.S. Appl. No. 12/189,336, Dec. 9, 2011.
Nenad Stankovic Kang Zhang, Visual Programming for Message-Passing Systems (1999), International Journal of Software Engineering and Knowledge Engineering.
Matthew J. Sottile, Vaddadi P. Chandu, David a. Bader, Performance analysis of parallel programs via message-passing graph traversal, College of Computing, Georgia Institute of Technology, Feb. 25, 2006.
"MPI-2: Extensions to the Message-Passing Interface," Forum, Nov. 15, 2003.
Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 12,166,748, Mar. 7, 2011.
Final Office Action, U.S. Appl. No. 11,832,192, Apr. 13, 2011.
Office Action, U.S. Appl. No. 11,764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.
University of Minnesota Super Computing Institute. 2009. Derived Data Types with MPI.
William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Huang et al., "DZM: MPI One-Sided Exploitation of LAIP API's Component Design, Communication Protocols & Application Tools Development", Jun. 6, 2006, pp. 1-70, IBM Corporation, Poughkeepsie, NY.
Tanenbaum, Andrew S., "Structured Computer Organization", 1984, Prentice-Hall, $2^{nd}$ Edition, pp. 10-12.
Final Office Action, U.S. Appl. No. 11/764,333, Sep. 2, 2011.
Office Action, U.S. Appl. No. 12/135,604, Nov. 4, 2011.
Notice of Allowance, U.S. Appl. No. 12/166,748, Nov. 9, 2011.
Office Action, U.S. Appl. No. 12/189,336, Sep. 13, 2012.
Office Action, U.S. Appl. No. 12/748,579, Sep. 19, 2012.
Notice of Allowance, U.S. Appl. No. 12/847,573, Jan. 11, 2012.
Office Action, U.S. Appl. No. 13/007,905, Dec. 28, 2012.
Office Action, U.S. Appl. No. 12/985,075, Nov. 7, 2012.
Office Action, U.S. Appl. No. 13/667,456, Jan. 2, 2013.
Notice of Allowance, U.S. Appl. No. 12/189,336, Mar. 27, 2013.
Office Action, U.S. Appl. No. 13/006,696, Mar. 4, 2013.
Final Office Action, U.S. Appl. No. 13/007,905, Apr. 17, 2013.
Final Office Action, U.S. Appl. No. 12/985,075, Apr. 18, 2013.
Final Office Action, U.S. Appl. No. 13/667,456, Apr. 19, 2013.

* cited by examiner

LOCALITY MAPPING IN A DISTRIBUTED PROCESSING SYSTEM

BACKGROUND OF THE INVENTION

1. Field of the Invention

The field of the invention is data processing, or, more specifically, methods, apparatus, and products for topology mapping in a distributed processing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include a plurality of compute nodes that are each running tasks that communicate with each other. Each task is not necessarily aware of the topology of the computing system. For example, each task may not know which other tasks are running on the same compute node, which tasks are running on other compute nodes, and so on.

SUMMARY OF THE INVENTION

Methods, apparatus, and products for topology mapping in a distributed processing system, the distributed processing system including a plurality of compute nodes, each compute node having a plurality of tasks, including: initiating, by a sending task, a message passing operation that is unrelated to topology mapping with a receiving task; including, by the sending task, in a message generated by the message passing operation topological information for the sending task; mapping, by the receiving task, the topological information for the sending task; determining whether the sending task and the receiving task reside on the same topological unit; if the sending task and the receiving task reside on the same topological unit, using an optimal local network pattern for subsequent message passing operations between the sending task and the receiving task; and if the sending task and the receiving task do not reside on the same topological unit, using a data communications network between the topological unit of the sending task and the topological unit of the receiving task for subsequent message passing operations between the sending task and the receiving task.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
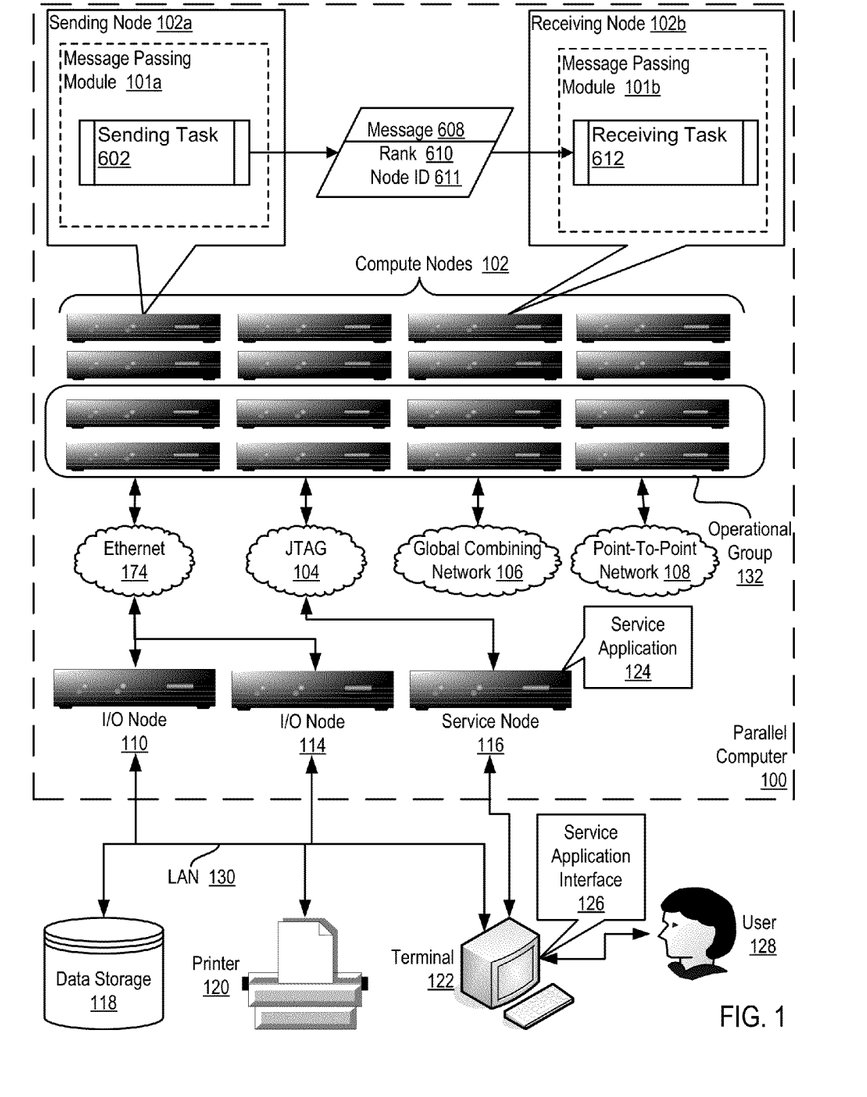
FIG. 1 sets forth example apparatus for topology mapping in a distributed processing system according to embodiments of the present invention.

Example methods, apparatus, and products for topology mapping in a distributed processing system in accordance with the present invention are described with reference to the accompanying drawings, beginning with FIG. 1. FIG. 1 sets forth example apparatus for topology mapping in a distributed processing system according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for topology mapping in a distributed processing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount * N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for topology mapping in a distributed processing system. Such a parallel computer (100) is typically composed of many compute nodes, but for ease of explanation two of the compute nodes in this example are referenced in particular, compute node (102a) and compute node (102b). Each compute node includes a message passing module (101a, 101b). In the example of FIG. 1, each message passing module (101a, 101b) may supports tasks that exchange messages. The message passing module (101a, 101b) of FIG. 1 may be embodied, for example, as computer program instructions that, when executed by a compute node (102a, 102b), facilitate the exchange of messages in a system configured for topology mapping.

In the example of FIG. 1, the parallel computer (100) carries out topology mapping in a distributed processing system by initiating, by a sending task (602), a message passing operation that is unrelated to topology mapping with a receiving task (612). In the example of FIG. 1, topology mapping is also carried out by including topological information in a message (608) generated by the message passing operation. In the example of FIG. 1, the topological information is embodied as an identification of the rank (610) of the sending task (602) and an identification (611) of the compute node (102a) upon which the sending task (602) resides. Readers will understand that topological information may also include, for example, an identification of network connections that are available to the sending task (602), an identification of the type of network connections that are available to the sending task (602), an identification of a network that includes the compute node upon which the sending task (602) resides, an identification of other compute nodes that are part of a network that includes the compute node upon which the sending task (602) resides, and so on.

In the example of FIG. 1, topology mapping is also carried out by mapping, by the receiving task (612), the topological information for the sending task (602). Mapping such topological information may be carried out, for example, by storing the topological information in memory available to the receiving task (612) such that the receiving task (612) has access to information describing the topology within which the sending task (602) operates.

In the example of FIG. 1, topology mapping is also carried out by determining whether the sending task (602) and the receiving task (612) reside on the same topological unit. In the example of FIG. 1, a topological unit is depicted as a single compute node such that the sending task (602) and the receiving task (612) reside on the same topological unit if the sending task (602) and the receiving task (612) reside on the same compute node. In alternative embodiments, a topological unit may include multiple compute nodes that share a direct data communications connection, as multiple compute nodes that share a particular type of connection, and so on such that the sending task (602) and the receiving task (612) are said to reside on the same topological unit if the sending task (602) and the receiving task (612) reside on any of the compute nodes in a particular topological unit.

In the example of FIG. 1, if the sending task (602) and the receiving task (612) reside on the same topological unit, the sending task (602) and the receiving task (612) may use an optimal local network pattern for subsequent message passing operations between the sending task (602) and the receiving task (602). In the example of FIG. 1, an optimal local network pattern can include local memory on a compute node such that if the sending task (602) and the receiving task (612) reside on the same compute node, the sending task (602) and the receiving task (612) may use local shared memory for subsequent message passing operations between the sending task (602) and the receiving task (602)—rather than using a data communications network for subsequent message passing operations between the sending task (602) and the receiving task (612). That is, in view of the fact that the sending task (602) and the receiving task (612) reside on the same topological unit, the sending task (602) and the receiving task (612) may make use of that topology for subsequent message passing operations rather than using a data communications network as would be required by two tasks that are not on the same topological unit. In the example of FIG. 1, if the sending task (602) and the receiving task (612) do not reside on the same topological unit, the sending task (602) and the receiving task (612) may use a data communications network between the topological unit of the sending task (602) and the topological unit of the receiving task (612) for subsequent message passing operations between the sending task (602) and the receiving task (612).

The arrangement of nodes, networks, and I/O devices making up the example apparatus illustrated in FIG. 1 are for explanation only, not for limitation of the present invention. Apparatus capable of topology mapping in a distributed processing system according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of topology mapping in a distributed processing system according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
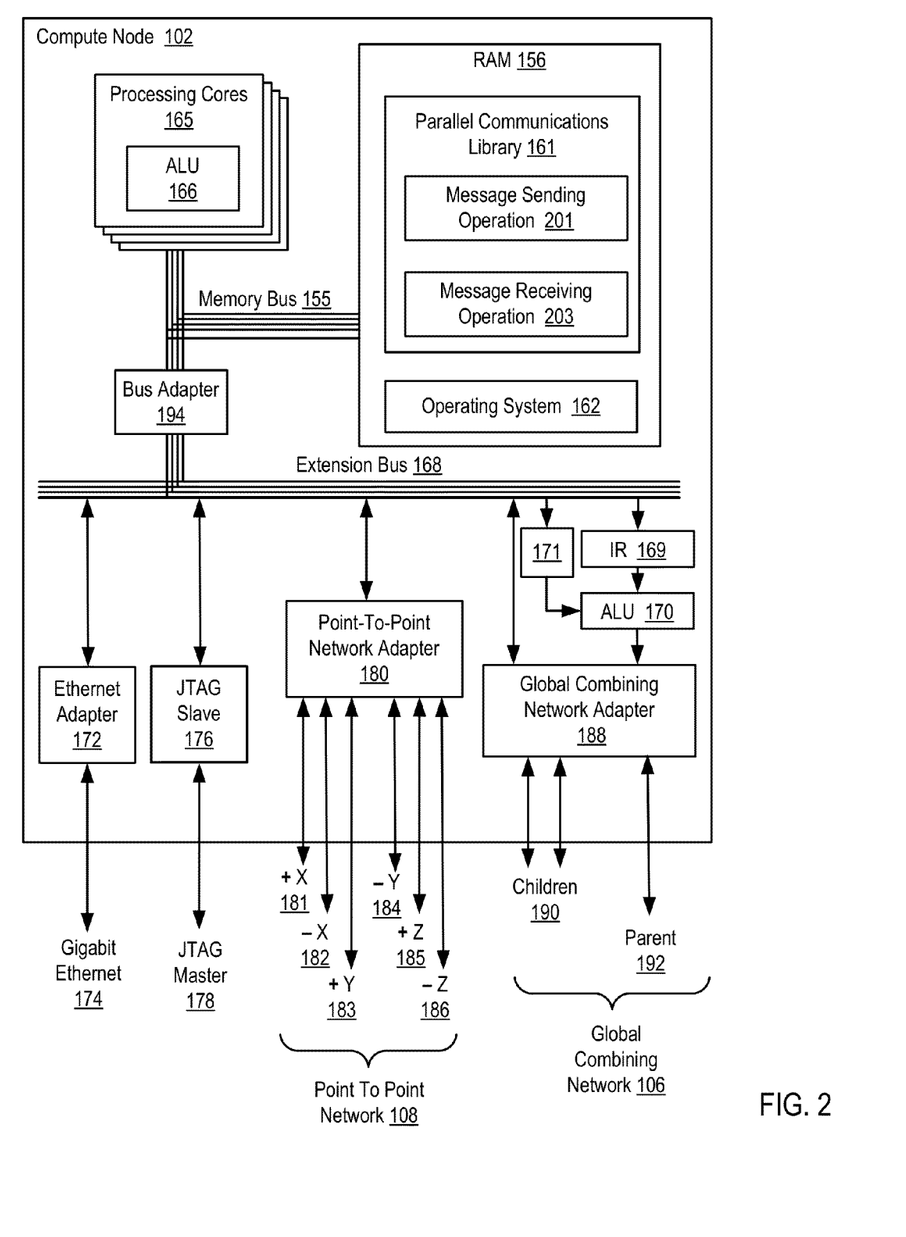
FIG. 2 sets forth a block diagram of an example compute node useful in a parallel computer capable of topology mapping in a distributed processing system according to embodiments of the present invention.

Topology mapping in a distributed processing system according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of topology mapping in a distributed processing system according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155)

and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations.

A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

In the example of FIG. 2, the parallel communications library (161) includes a message sending operation (201) and a message receiving operation (203). In the example of FIG. 2, the message sending operation (201) may be useful for topology mapping in a distributed processing system as the message sending operation (201) may be used by a sending task to send a message that is unrelated to topology mapping with a receiving task. The message sending operation (201) may also be useful for topology mapping in a distributed processing system as the message sending operation (201) may be used by a sending task to include in a message generated by the message sending operation (201) topological information for the sending task. In the example of FIG. 2, the message receiving operation (203) may be useful for topology mapping in a distributed processing system as the message receiving operation (203) may be used by a receiving task to map the topological information for the sending task and to determine whether the sending task and the receiving task reside on the same topological unit. In such an example, if the sending task and the receiving task reside on the same topological unit, the tasks may use an optimal local network pattern for subsequent message passing operations between the tasks, otherwise the tasks may use a data communications network between the topological unit of the sending task and the topological unit of the receiving task for subsequent message passing operations between the tasks.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for topology mapping in a distributed processing system include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for topology mapping in a distributed processing system according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
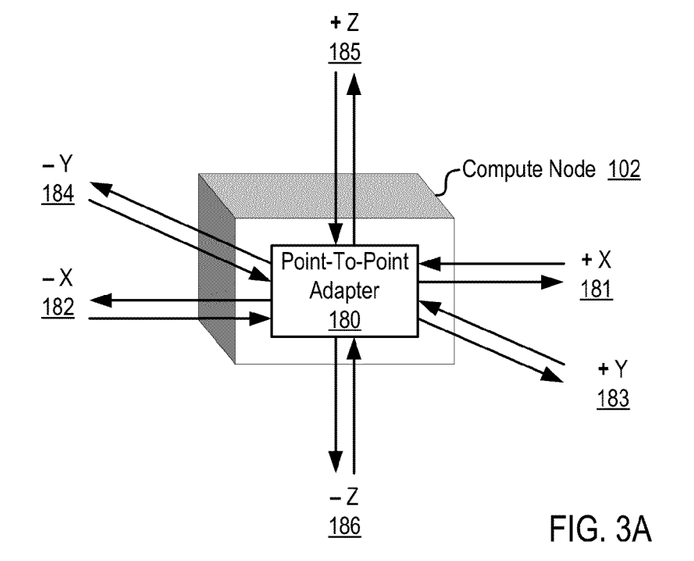
FIG. 3A sets forth a block diagram of an example Point-To-Point Adapter useful in systems for topology mapping in a distributed processing system according to embodiments of the present invention.

For further explanation, FIG. 3A sets forth a block diagram of an example Point-To-Point Adapter (180) useful in systems for topology mapping in a distributed processing system according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
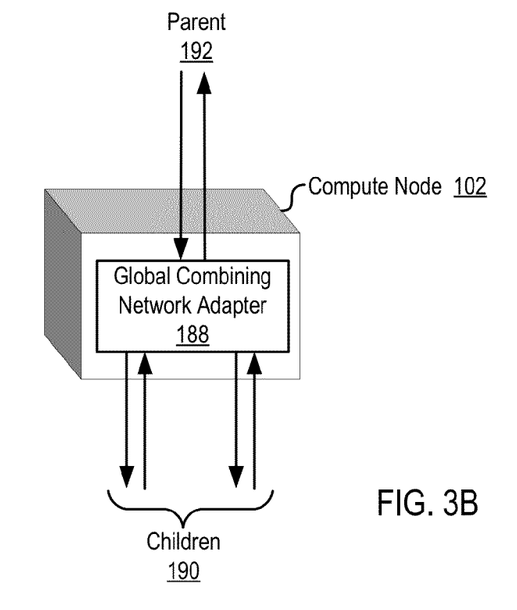
FIG. 3B sets forth a block diagram of an example Global Combining Network Adapter useful in systems for topology mapping in a distributed processing system according to embodiments of the present invention.

For further explanation, FIG. 3B sets forth a block diagram of an example Global Combining Network Adapter (188) useful in systems for topology mapping in a distributed processing system according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
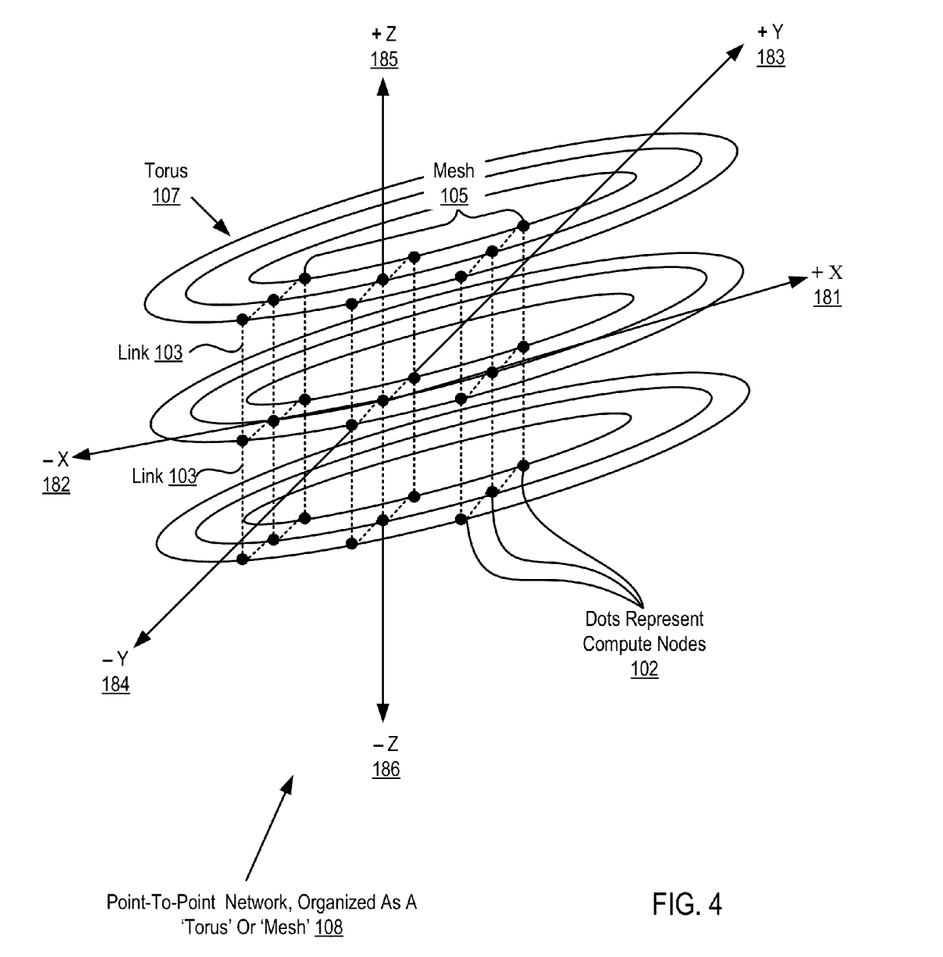
FIG. 4 sets forth a line drawing illustrating an example data communications network optimized for point-to-point operations useful in systems capable of topology mapping in a distributed processing system according to embodiments of the present invention.

For further explanation, FIG. 4 sets forth a line drawing illustrating an example data communications network (108) optimized for point-to-point operations useful in systems capable of topology mapping in a distributed processing system according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in topology mapping in a distributed processing system in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in topology mapping in a distributed processing system in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
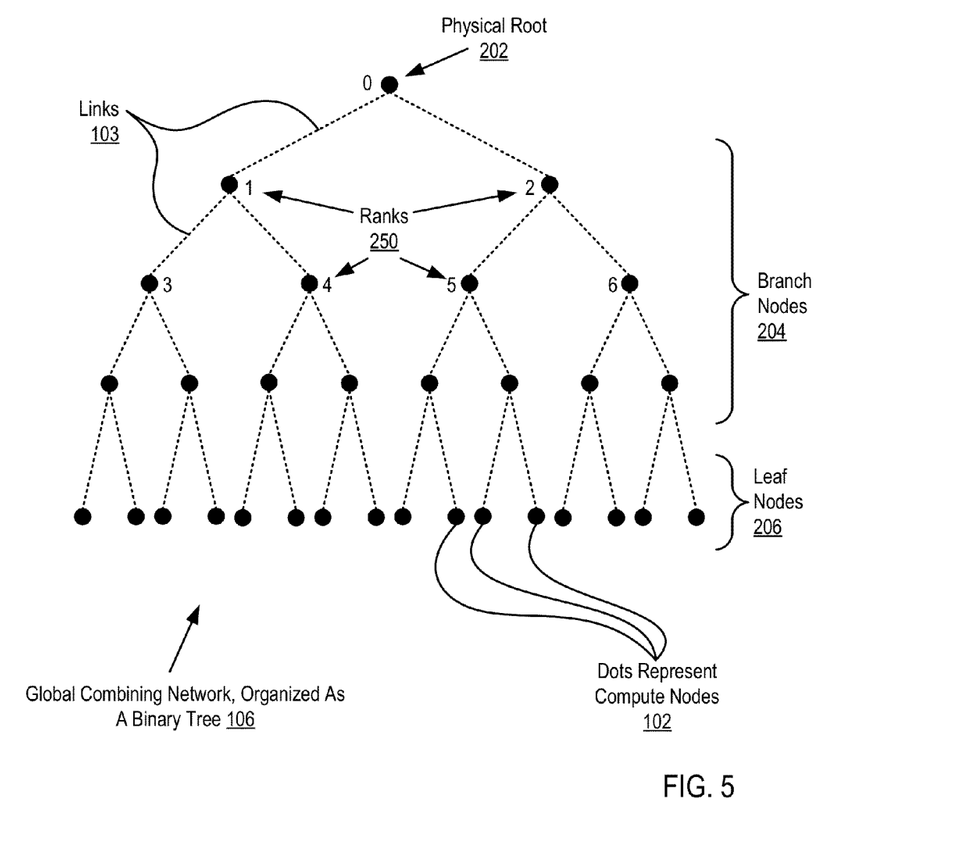
FIG. 5 sets forth a line drawing illustrating an example global combining network useful in systems capable of topology mapping in a distributed processing system according to embodiments of the present invention.

For further explanation, FIG. 5 sets forth a line drawing illustrating an example global combining network (106) useful in systems capable of topology mapping in a distributed processing system according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in topology mapping in a distributed processing system in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
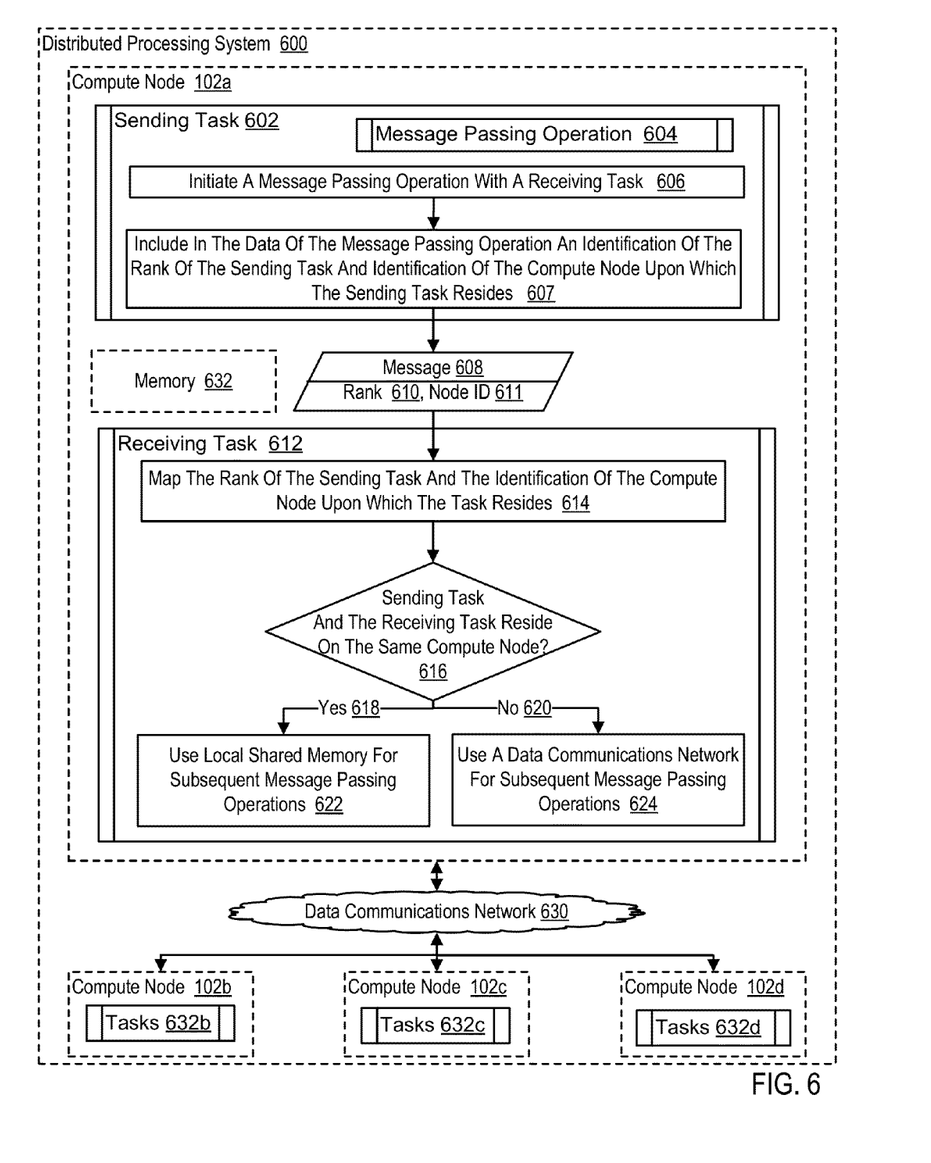
FIG. 6 sets forth a flow chart illustrating an example method for topology mapping in a distributed processing system according to embodiments of the present invention.

For further explanation, FIG. 6 sets forth a flow chart illustrating an example method for topology mapping in a distributed processing system (600) according to embodiments of the present invention. FIG. 6 represents a specific embodiment in which topological information exchanged between two tasks (602, 612) includes only a rank (610) of the sending task (612) and identification (611) of the compute node that the sending task (612) resides upon. In the specific embodiment described in FIG. 6, a topological unit is depicted as a compute node (102a) such that two tasks (602, 612) that reside on the same compute node (102a) are said to reside upon the same topological unit—while two tasks that reside on different compute nodes (102a, 102b, 102c, 102d) are said to reside upon the different topological units. In the specific embodiment described in FIG. 6, an optimal local network pattern is depicted as local memory (632) on a compute node (102a). That is, local memory (632) on a compute node (102a) represents computer storage that is available to a sending task (602) and a receiving task (612) that reside on the same compute node (i.e., the same topological unit in this embodiment), such that a sending task (602) and a receiving task (612) that reside on the same compute node (102a) can use the memory (632) on that compute node (102a) to exchange messages, rather than transmitting messages over a data communications network (630) that is external to each task (602, 612).

In the example of FIG. 6, the distributed processing system (600) includes a plurality of compute nodes (102a, 102b, 102c, 102d). Each compute node (102a, 102b, 102c, 102d) in the example of FIG. 6 has a plurality of tasks (602, 612, 632b, 632c, 632d), each of which is assigned a unique rank. In the example of FIG. 6, the rank serves as an identifier for a particular task (602, 612, 632b, 632c, 632d) as each rank is unique.

The example of FIG. 6 includes initiating (606), by a sending task (602), a message passing operation (604) that is unrelated to topology mapping with a receiving task (612). In the example of FIG. 6, a message passing operation (604) that is unrelated to topology mapping with a receiving task (612) may be embodied, for example, as computer program instructions that, when executed, cause a message to be passed from a first task operating on a compute node to a second task operating on a compute node. A message passing operation (604) that is unrelated to topology mapping with a receiving task (612) may include, for example, message passing operations available through MPI as described above.

The example of FIG. 6 also includes including (607), by the sending task (602), in a message (608) generated by the message passing operation (604) an identification of the rank (610) of the sending task (602) and identification (611) of the compute node (102a) upon which the sending task (602) resides. In the example of FIG. 6, including (607) an identification of the rank (610) of the sending task (602) and an identification (611) of the compute node (102a) upon which the sending task (602) resides in a message (608) generated by the message passing operation (604) may be carried out, for example, by including the identification of the rank (610) of the sending task (602) and the identification (611) of the compute node (102a) upon which the sending task (602) resides as parameters in the message (608), including such information in a header of the message (608), and so on.

In the example of FIG. 6, including (607) topological information in a message (608) generated by the message passing operation (604) may occur only when the receiving task (612) does not have possession of topological information for the sending task (602). That is, rather than sending topological information multiple times to a receiving task (612) that is already aware of the topology within which the sending task (602) operates, the sending task (602) may only include topological information in messages when it is beneficial to do so. For example, the sending task (602) may include topological information in a message (608) only the first time that the sending task (602) sends a message (608) to the receiving task (612). Alternatively, the sending task (602) may include topological information in a message (608) to the receiving task (612) at predetermined intervals, upon request, a maximum number times, and so on.

The example of FIG. 6 also includes mapping (614), by the receiving task (612), the rank (610) of the sending task (602) and the identification (611) of the compute node (102a) upon which the sending task (602) resides. In the example of FIG. 6, mapping (614) the rank (610) of the sending task (602) and the identification (611) of the compute node (102a) upon which the sending task (602) resides may be carried out, for example, by creating an entry in a task topology table for the receiving task (612). Table 1 illustrates an example of a task topology table:

TABLE 1

Task Topology Table

| Task Rank | Compute Node ID |
|---|---|
| 1 | 102a |
| 2 | 102c |
| 3 | 102d |
| 4 | 102d |
| 5 | 102b |
| 6 | 102a |

In the task topology table illustrated in table 1, there are six entries representing six tasks. The six entries indicate that tasks with ranks of '1' and '6' are operating on compute node (102a), a task with a rank of '5' is operating on compute node (102b), a task with a rank of '2' is operating on compute node (102c), and tasks with ranks of '3' and '4' are operating on compute node (102d). In such an example, because the receiving task (612) is operating on compute node (102a), tasks with ranks of '1' and '6' are operating on the same compute node (102a) as the receiving task (612) while all other tasks in the task topology table are operating on compute nodes (102b, 102c, 102d) other than the compute node (102a) upon which the receiving task (612) resides.

The example of FIG. 6 also includes determining (616) whether the sending task (602) and the receiving task (612) reside on the same compute node (102a). In the example of FIG. 6, determining (616) whether the sending task (602) and the receiving task (612) reside on the same compute node (102a) may be carried out, for example, by searching a task topology table to determine whether the sending task (602) resides on the same compute node (102a) as the receiving task (612). As described above, the message (608) generated by sending task (602) includes the identification of the rank (610) of the sending task (602) and the identification (611) of the compute node (102a) upon which the sending task (602) resides. This information may be used by the receiving task (612), along with information in the task topology table, to determine whether the sending task (602) and the receiving task (612) reside on the same compute node (102a).

The example of FIG. 6 includes using local shared memory (632) for subsequent message passing operations between the sending task (602) and the receiving task (612) if the sending task (602) and the receiving task (612) do (618) reside on the same compute node (102a). In the example of FIG. 6, the local shared memory (632) may be embodied, for example, as memory (632) in the compute node (102a) that is utilized, for example, as a messaging queue. Subsequent message passing operations between the sending task (602) and the receiving task (612) may therefore be carried out by inserting messages into the messaging queue such that messages can be exchanged by the sending task (602) and the receiving task (612) without the message ever being transmitted over a network.

The example of FIG. 6 includes using a data communications network (630) between the compute nodes (102a, 102b, 102c, 102d) for subsequent message passing operations between the sending task (602) and the receiving task (612) if the sending task (602) and the receiving task (6012) do not (620) reside on the same compute node (102a). In the example of FIG. 6, the data communications network (630) may be embodied, for example, as a point-to-point network, a global combining network, and so on as described above.

Figure 7:
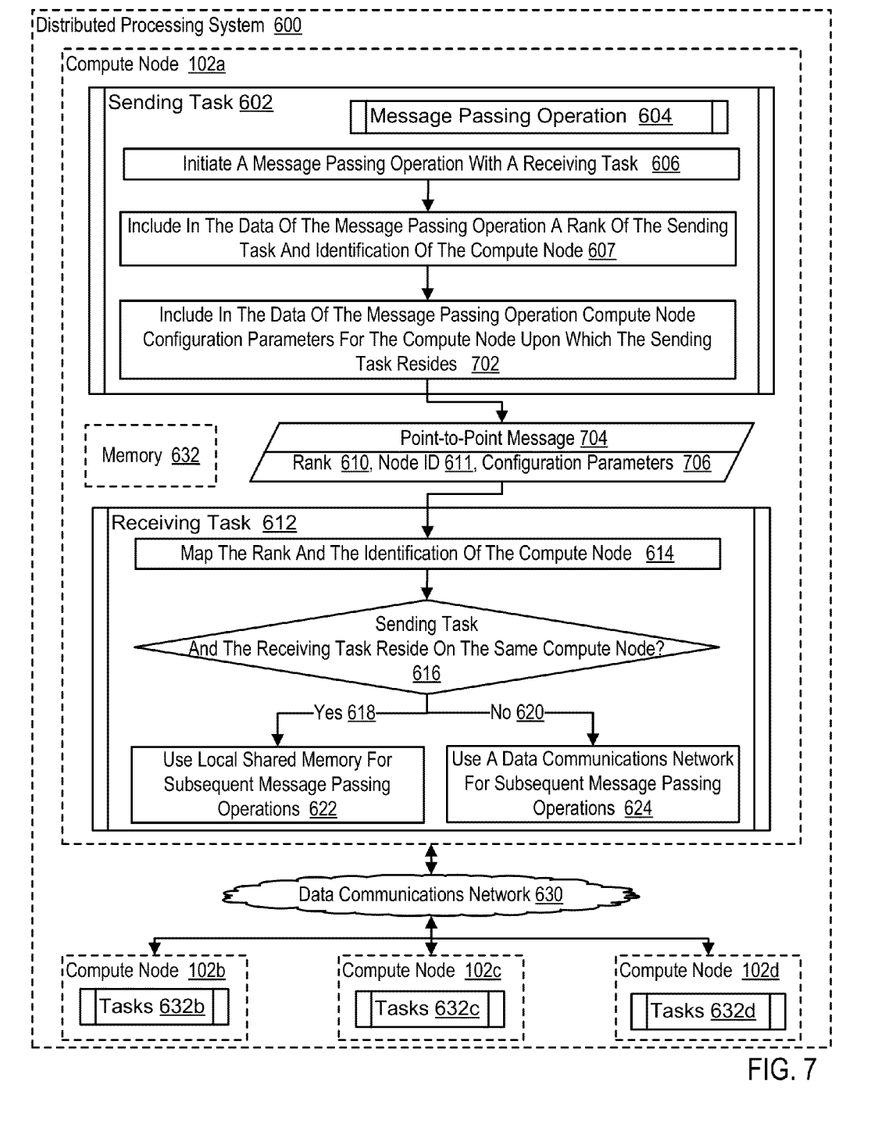
FIG. 7 sets forth a flow chart illustrating a further example method for topology mapping in a distributed processing system according to embodiments of the present invention.

For further explanation, FIG. 7 sets forth a flow chart illustrating a further example method for topology mapping in a distributed processing system (600) according to embodiments of the present invention. The example of FIG. 7 is similar to the example of FIG. 6 as it also includes:

initiating (606), by a sending task (602), a message passing operation (604) that is unrelated to topology mapping with a receiving task (612), including (607), by the sending task (602), in a message (704) generated by the message passing operation (604) an identification of the rank (610) of the sending task (602) and an identification (611) of the compute node (102a) upon which the sending task (602) resides, mapping (614), by the receiving task (612), the rank (610) of the sending task (602) and the identification (611) of the compute node (102a) upon which the sending task (602) resides, determining (616) whether the sending task (602) and the receiving task (612) reside on the same compute node (102a), if the sending task (602) and the receiving task (612) do (618) reside on the same compute node (102a), using (622) local shared memory (632) for subsequent message passing operations between the sending task (602) and the receiving task (612), and if the sending task (602) and the receiving task (612) do not (620) reside on the same compute node (102a), using (624) a data communications network (630) between the compute nodes (102a, 102b, 102c, 102d) for subsequent message passing operations between the sending task (602) and the receiving task (612).

The example of FIG. 7 also includes including (702), by the sending task (602), in the message (704) generated by the message passing operation (604), compute node configuration parameters (706) for the compute node (102a) upon which the sending task (602) resides. In the example of FIG. 7, the configuration parameters (706) for the compute node (102a) upon which the sending task (602) resides can provide more refined additional information about the compute node (102a) upon which the sending task (602) resides such as, for example, a listing of network resources of the compute node (102a), addressing information for the compute node (102a), and so on.

In the example of FIG. 7, the message passing operation (604) generates a point-to-point message (704). In the example of FIG. 7, a point-to-point message (704) may be transmitted using a point-to-point adapter as described above with reference to FIG. 3A. Such messages may be transmitted using a torus network topology as described above with reference to FIG. 4.

Figure 8:
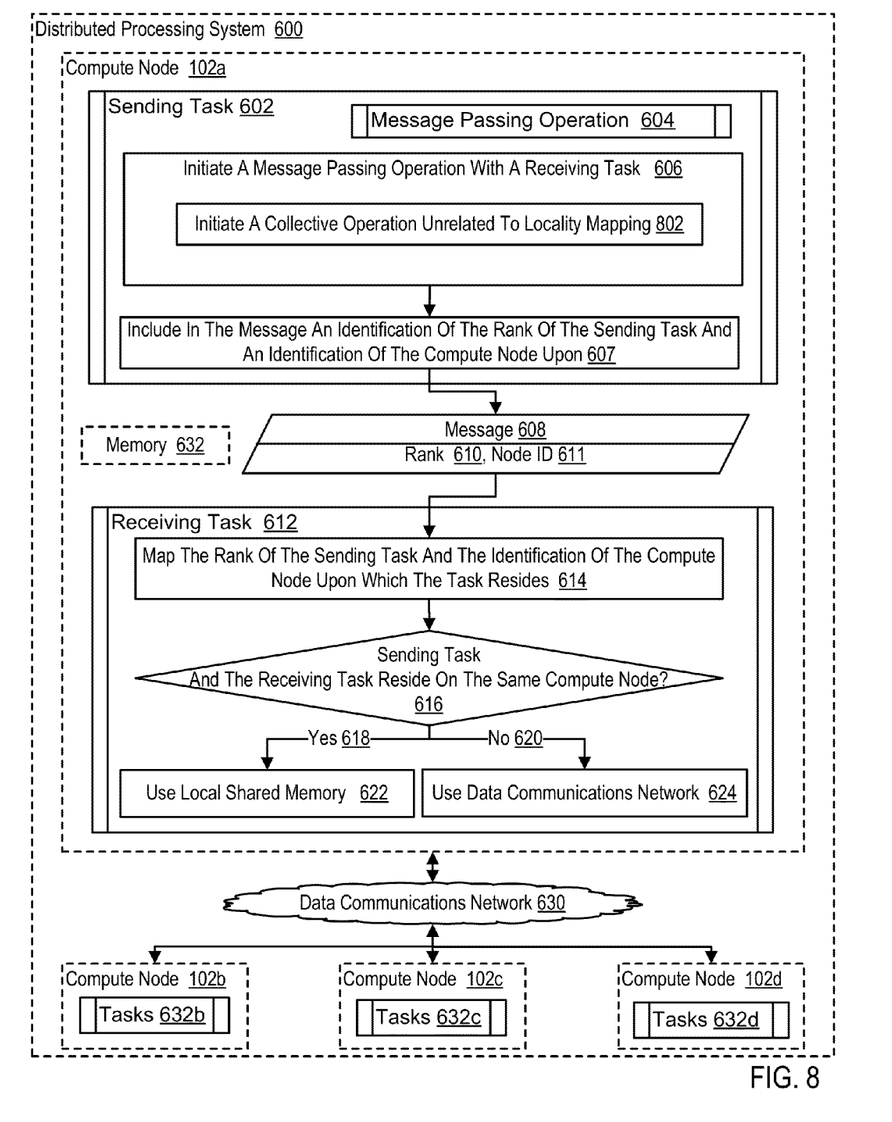
FIG. 8 sets forth a flow chart illustrating a further example method for topology mapping in a distributed processing system according to embodiments of the present invention.

For further explanation, FIG. 8 sets forth a flow chart illustrating a further example method for topology mapping in a distributed processing system (600) according to embodiments of the present invention. The example of FIG. 8 is similar to the example of FIG. 6 as it also includes:

initiating (606), by a sending task (602), a message passing operation (604) that is unrelated to topology mapping with a receiving task (612), including (607), by the sending task (602), in a message (704) generated by the message passing operation (604) an identification of the rank (610) of the sending task (602) and an identification (611) of the compute node (102a) upon which the sending task (602) resides, mapping (614), by the receiving task (612), the rank (610) of the sending task (602) and the identification (611) of the compute node (102a) upon which the sending task (602) resides, determining (616) whether the sending task (602) and the receiving task (612) reside on the same compute node (102a), if the sending task (602) and the receiving task (612) do (618) reside on the same compute node (102a), using (622) local shared memory (632) for subsequent message passing operations between the sending task (602) and the receiving task (612), and if the sending task (602) and the receiving task (612) do not (620) reside on the same compute node (102a), using (624) a data communications network (630) between the compute nodes (102a, 102b, 102c, 102d) for subsequent message passing operations between the sending task (602) and the receiving task (612).

In the example of FIG. 8, however, the message passing operation (604) is a collective operation. As described above, collective operations are those functions that involve all the compute nodes of an operational group. A collective operation is an operation, a message-passing computer program instruction that is executed simultaneously, that is, at approximately the same time, by all the compute nodes in an operational group of compute nodes.

In the example of FIG. 8, also includes initiating (606), by a sending task (602), a message passing operation (604) that is unrelated to topology mapping with a receiving task (612) includes initiating (802), by each task (602, 612), a collective operation unrelated to topology mapping. Because collective operations are executed at approximately the same time by all the compute nodes in an operational group of compute nodes, initiating (606) a message passing operation (604) that is a collective operation by one task, such as the sending task (602), requires that all other tasks, such as the receiving task (612) also initiate the same collective operation if each task (602, 612) is part of the same operational group.

FIGS. 6-8 represent specific embodiments in which topological information exchanged between two tasks includes only a rank of the sending task and an identification of the compute node that the sending task resides upon. Readers will appreciate, however, that topological information exchanged between two tasks may include other information describing the topology that each task operates within. For example, topological information may include information describing the data communication connections that are available to the task, an identification of the compute nodes that task can communicate with directly, an identification of the types of data communication connections that are available to the task, and so on.

In the specific embodiments described in FIGS. 6-8, a topological unit is depicted as a compute node (102a). Readers will appreciate that a topological unit may be embodied, for example, as a collection of compute nodes that share a direct data communications link with each other, a collection of compute nodes that share a particular type of data communications link with each other, and so on. In the specific embodiments described in FIGS. 6-8, an optimal local network pattern is depicted as being shared memory on a single compute node. Readers will appreciate that an optimal local network pattern may be embodied, for example, as shared memory between two or more compute nodes, as a direct data communications link between two nodes, as a particular type of data communications link between two nodes, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of topology mapping in a distributed processing system, the distributed processing system including a plurality of compute nodes, each compute node having a plurality of tasks, the method comprising:
   initiating, by a sending task, a message passing operation that is unrelated to topology mapping with a receiving task;
   including, by the sending task, in a message generated by the message passing operation topological information for the sending task;
   mapping, by the receiving task, the topological information for the sending;
   determining whether the sending task and the receiving task reside on the same topological unit, wherein a topological unit is a plurality of compute nodes that share a direct data communications connection; wherein the sending task and the receiving task are on different compute nodes;
   if the sending task and the receiving task reside on the same topological unit, using an optimal local network pattern for subsequent message passing operations between the sending task and the receiving task; and
   if the sending task and the receiving task do not reside on the same topological unit, using a data communications network between the topological unit of the sending task and the topological unit of the receiving task for subsequent message passing operations between the sending task and the receiving task.

2. The method of claim 1 further comprising including, by the sending task, in the message generated by the message passing operation, topological unit configuration parameters for the topological unit upon which the sending task resides.

3. The method of claim 1 wherein the message passing operation generates a point-to-point message.

4. The method of claim 1 wherein the message passing operation is a collective operation and initiating, by a sending task, a message passing operation that is unrelated to topology mapping with a receiving task further comprises initiating, by each task, a collective operation unrelated to topology mapping.

5. The method of claim 1 wherein including, by the sending task, in a message generated by the message passing operation topological information for the sending task occurs only when the receiving task does not have possession of topological information for the sending task.

6. The method of claim 1 wherein the optimal local network pattern is shared memory.

7. An apparatus for topology mapping in a distributed processing system, the apparatus comprising a computer processor and a computer memory operatively coupled to the computer processor, the computer memory having disposed within it computer program instructions that, when executed by the computer processor, cause the apparatus to carry out the steps of:
   initiating, by a sending task, a message passing operation that is unrelated to topology mapping with a receiving task;
   including, by the sending task, in a message generated by the message passing operation topological information for the sending task;
   mapping, by the receiving task, the topological information for the sending task;
   determining whether the sending task and the receiving task reside on the same topological unit, wherein a topological unit is a plurality of compute nodes that share a direct data communications connection; wherein the sending task and the receiving task are on different compute nodes;
   if the sending task and the receiving task reside on the same topological unit, using an optimal local network pattern for subsequent message passing operations between the sending task and the receiving task; and
   if the sending task and the receiving task do not reside on the same topological unit, using a data communications network between the topological unit of the sending task and the topological unit of the receiving task for subsequent message passing operations between the sending task and the receiving task.

8. The apparatus of claim 7 further comprising computer program instructions that, when executed by the computer processor, cause the apparatus to carry out the step of including, by the sending task, in the message generated by the message passing operation, topological unit configuration parameters for the topological unit upon which the sending task resides.

9. The apparatus of claim 7 wherein the message passing operation generates a point-to-point message.

10. The apparatus of claim 7 wherein the message passing operation is a collective operation and initiating, by a sending task, a message passing operation that is unrelated to topology mapping with a receiving task further comprises initiating, by each task, a collective operation unrelated to topology mapping.

11. The apparatus of claim 7 wherein including, by the sending task, in a message generated by the message passing operation topological information for the sending task occurs only when the receiving task does not have possession of topological information for the sending task.

12. The apparatus of claim 7 wherein the optimal local network pattern is shared memory.

13. A computer program product for topology mapping in a distributed processing system, the computer program product disposed upon a non-transitory computer readable storage medium, the computer program product comprising computer program instructions that, when executed, cause a computer to carry out the steps of:
- initiating, by a sending task, a message passing operation that is unrelated to topology mapping with a receiving task;
- including, by the sending task, in a message generated by the message passing operation topological information for the sending task;
- mapping, by the receiving task, the topological information for the sending task;
- determining whether the sending task and the receiving task reside on the same topological unit, wherein a topological unit is a plurality of compute nodes that share a direct data communications connection; wherein the sending task and the receiving task are on different compute nodes;
- if the sending task and the receiving task reside on the same topological unit, using an optimal local network pattern for subsequent message passing operations between the sending task and the receiving task; and
- if the sending task and the receiving task do not reside on the same topological unit, using a data communications network between the topological unit of the sending task and the topological unit of the receiving task for subsequent message passing operations between the sending task and the receiving task.

14. The computer program product of claim 13 further comprising computer program instructions that, when executed, cause a computer to carry out the step of including, by the sending task, in the message generated by the message passing operation, topological unit configuration parameters for the topological unit upon which the sending task resides.

15. The computer program product of claim 13 wherein the message passing operation generates a point-to-point message.

16. The computer program product of claim 13 wherein the message passing operation is a collective operation and initiating, by a sending task, a message passing operation that is unrelated to topology mapping with a receiving task further comprises initiating, by each task, a collective operation unrelated to topology mapping.

17. The computer program product of claim 13 wherein including, by the sending task, in a message generated by the message passing operation topological information for the sending task occurs only when the receiving task does not have possession of topological information for the sending task.

18. The computer program product of claim 13 wherein the optimal local network pattern is shared memory.

\* \* \* \* \*